United States Patent
Simske et al.

(10) Patent No.: US 7,209,599 B2
(45) Date of Patent: Apr. 24, 2007

(54) SYSTEM AND METHOD FOR SCANNED IMAGE BLEEDTHROUGH PROCESSING

(75) Inventors: Steven John Simske, Fort Collins, CO (US); John Roland Burns, Santa Cruz, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 738 days.

(21) Appl. No.: 10/194,349

(22) Filed: Jul. 12, 2002

(65) Prior Publication Data
US 2004/0008884 A1    Jan. 15, 2004

(51) Int. Cl.
*G06K 9/40* (2006.01)
(52) U.S. Cl. ...................... 382/275; 382/274
(58) Field of Classification Search ............... 382/274, 382/275
See application file for complete search history.

(56) References Cited

U.S. PATENT DOCUMENTS

| | | | |
|---|---|---|---|
| 4,811,245 A | 3/1989 | Bunker et al. | |
| 5,418,574 A | 5/1995 | Miyabata et al. | |
| 5,646,744 A * | 7/1997 | Knox | 358/401 |
| 6,067,385 A | 5/2000 | Cullen et al. | |
| 6,101,283 A * | 8/2000 | Knox | 382/254 |
| 6,104,839 A * | 8/2000 | Cok et al. | 382/254 |
| 6,219,158 B1 | 4/2001 | Dawe | |
| 6,288,798 B1 * | 9/2001 | Sharma | 358/448 |
| 6,348,980 B1 | 2/2002 | Cullen et al. | |
| 6,381,357 B1 | 4/2002 | Tan et al. | |
| 6,862,117 B1 * | 3/2005 | Ford et al. | 358/475 |
| 2002/0071131 A1 * | 6/2002 | Nishida | 358/1.9 |
| 2002/0071613 A1 | 6/2002 | Ford et al. | |

FOREIGN PATENT DOCUMENTS

| | | |
|---|---|---|
| EP | 0713342 | 9/1996 |
| EP | 0 569 142 | 10/1998 |
| EP | 0 998 138 | 5/2000 |
| EP | 0963106 | 5/2002 |
| WO | WO 01/48694 | 7/2001 |
| WO | WO 03/019472 | 3/2003 |

OTHER PUBLICATIONS

European Search Report issued for GB0316218.7, dated Jun. 1, 2004.
Patents Act 1977: Search Report under Section 17, The Patent Office, Nov. 4, 2003.

\* cited by examiner

*Primary Examiner*—Vikkram Bali
*Assistant Examiner*—Colin LaRose

(57) ABSTRACT

Disclosed are systems and methods for identifying bleedthrough in an image in which a reference tone point of a first image is determined, putative bleedthrough pixels in the first image are identified as a function of the reference tone point, the putative bleedthrough pixels are mapped into a putative bleedthrough representation of said first image, and the putative bleedthrough pixel mapping is analyzed to determine if bleedthrough is present in said first image. Also disclosed are systems and methods for removing bleedthrough from an image in which a document is scanned to provide an electronic first image and an electronic second image, a putative bleedthrough pixel mapping for the first image is generated, the putative bleedthrough pixel mapping is processed using information with respect to said second image, and pixels of the first image corresponding to putative bleedthrough pixels of said mapping are replaced.

37 Claims, 3 Drawing Sheets

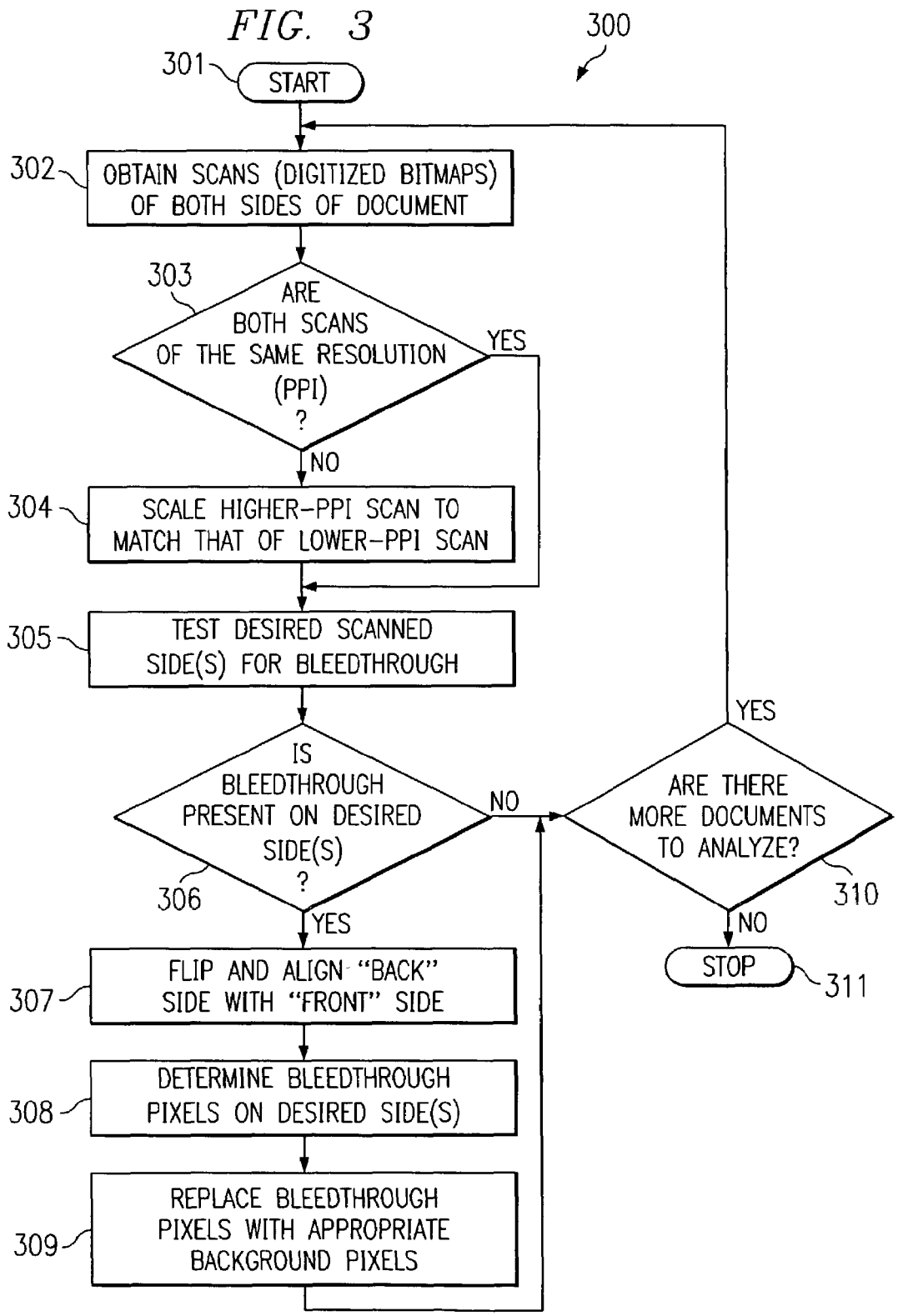

SYSTEM AND METHOD FOR SCANNED IMAGE BLEEDTHROUGH PROCESSING

FIELD OF INVENTION

The invention relates generally to image processing and, more particularly, to systems and methods for scanned image bleedthrough processing.

BACKGROUND OF THE INVENTION

Electronic capturing and processing of images, whether textual, graphic, monochrome, and/or color, has been widely used for a number of years. For example, personal computer systems with optical scanners attached thereto, operable under control of an image scanning and/or image processing application program, have become readily available for business and individual use. Paper documents are converted into electronic documents through the use of a scanning device such as a desktop scanner, digital camera, all-in-one device, etcetera, Scanning is often followed by text or image processing steps such as optical character recognition (OCR) for the conversion of bitmapped text into ASCII/Unicode text, or vectorization of graphics (e.g., to Bezier or scalable vector graphics (SVG) format).

However, the technology implemented in capturing and processing such images is not without disadvantage. Scanned images often include anomalies in the electronic image that are not present in an original scanned copy or that do not accurately represent the original scanned copy. For example, an electronic image captured using a typical personal computer-based scanner may include anomalous bits associated with the phenomena of "bleedthrough," resulting in an electronic image that does not accurately represent the original scanned copy. Bleedthrough results from images on the back side of a document that are visible, or partly visible, during scanning of the front side of the document. Accordingly, a mirrored "ghost" of the image from the back of the document may appear in the document's scanned front image as a result of bleedthrough. Typically, the ghost image is particularly prevalent in "background" areas of the scanned front image. However, such a ghost image typically does not directly correspond to the image from the back of the document due to such things as scattering (light dispersion associated with the document media), level of darkness of the back image, level of darkness of the front image, irregularities in the document media, and the like.

The presence and/or extent of bleedthrough present in any particular situation may be affected by a number of variables. For example, the quality and/or thickness of the paper comprising the document, the particular optics used in scanning the document, the intensity of the light illuminating the document for the scan, and the light angle may all affect the extent to which bleedthrough is present in any particular scanned image.

In the past, image scanning has been user interface-centric. That is, scanning has typically been accomplished through a user placing one sheet of a document to be scanned upon a scanner and the user selecting scanning parameters for the specific image to be scanned. For example, the user may select the region or regions to be scanned, the type of image to be scanned, the intensity level of the scan, etcetera. After an image has been acquired, the user may further manipulate the scanned image to provide a desired result, such as to crop unwanted image areas. In extreme situations, the user may elect to discard the scanned image and reattempt to acquire a scanned image, such as by adjusting one or more of the aforementioned scanning parameters.

Such user interface-centric scanning has been acceptable for many situations in the past. However, as image processing technology has matured over the past decade commercial, high volume, and/or more automated scanning has become desirable. For example, it is not uncommon for document scanning to involve the need to scan many numbers of pages at a time, such as in commercial publishing. Accordingly, if scanning is to be accomplished in a reasonable amount of time and for a reasonable cost, it has become desirable to automate the process, thereby reducing the level of user input with respect to specific individual documents to be scanned. Moreover, the uses to which such scanned images are to be put often demand reliable, high-quality scans, such as to provide accurate optical character recognition and/or to avoid the need for substantial proofing/manipulation of a scanned image by an operator.

Attempts have been made to automatically detect bleedthrough present in scanned images. However, it is very difficult to determine what is bleedthrough and what is not. A determination of which portions of a scanned image are the result of bleedthrough may be based upon those areas of the image containing pixels of a certain range of intensity, i.e., gray scale values. Bleedthrough determinations based solely upon such criteria often will result in desired portions of the scanned image, i.e., the image from the front side of the document, that have similar intensity characteristics being identified as bleedthrough. For example, a bleedthrough detector based upon this technique may misidentify background features of the front image as bleedthrough. Similarly, pixels associated with a transition from one feature in an image to another feature in the image may be misidentified as bleedthrough, as there is typically not an instantaneous transition from one feature in an image to another feature in an image.

Utilization of the above-mentioned bleedthrough determination techniques in automated manipulation of the scanned image can result in undesirable results. For example, pixels surrounding text characters, wherein a character edge transitions to an image background, may be identified as bleedthrough and, therefore, removed and replaced with white or blank pixels. However, this has been found to result in the characters being surrounded by white, providing an effect where the characters appear to have been cut out and pasted in the image much like a ransom note.

Other techniques for removal of bleedthrough also have less than desirable results. For example, where an image includes only text characters, it may be possible to binarize the image to remove bleedthrough. Specifically, an image may be binarized by making it all black and white with no gray, i.e., a bit depth of 1 instead of 8 or 24. When an image is binarized, unless the original document presents particularly poor bleedthrough characteristics such as a magazine page, substantially all of the bleedthrough will be turned to white. However, the gray information, such as in the transition areas along the edges of the text characters will be lost, often providing undesired results, e.g., binarization may result in thin character attributes being removed along with the bleedthrough. For example, if the letter "T" appeared in the scanned image, binarization may result in the loss of the cross bar and, thus, the character may be identified by an OCR application as the number "1" or a lowercase rendition of the letter "L".

BRIEF SUMMARY OF THE INVENTION

An embodiment of the present invention provides a method for identifying bleedthrough in an image comprising determining a reference tone point of a first image, identifying putative bleedthrough pixels in the first image as a function of the reference tone point, mapping the putative bleedthrough pixels into a putative bleedthrough representation of the first image, and analyzing the putative bleedthrough pixel mapping to determine if bleedthrough is present in the first image.

Embodiments of the present invention provide a method of processing bleedthrough in an image comprising identifying putative bleedthrough pixels in a first image, mapping the putative bleedthrough pixels into a putative bleedthrough representation of the first image, and processing the putative bleedthrough pixel mapping to remove false positive bleedthrough pixels therefrom.

Embodiments of the present invention provide a method for removing bleedthrough from an image comprising scanning a document to provide an electronic first image, scanning the document to provide an electronic second image, wherein the first and second images are associated with juxtaposed sides of the document, generating a putative bleedthrough pixel mapping for the first image, processing the putative bleedthrough pixel mapping using information with respect to the second image and replacing pixels of the first image corresponding to putative bleedthrough pixels of the mapping.

A computer program product having a computer-readable medium having computer program logic recorded thereon for removing bleedthrough from an image is provided according to an embodiment of the present invention comprising code for generating a putative bleedthrough pixel mapping for a first image, code for processing the putative bleedthrough pixel mapping using information with respect to a second image, wherein the first image and the second image are associated with juxtaposed sides of a document, and code for replacing pixels of the first image corresponding to putative bleedthrough pixels of the mapping.

Embodiments of the present invention provide a system for removing bleedthrough from an image comprising means for generating a putative bleedthrough pixel mapping for a first image, means for comparing information with respect to a second image to the putative bleedthrough pixel mapping, and means for replacing pixels of the first image corresponding to putative bleedthrough pixels of the mapping using replacement pixels.

BRIEF DESCRIPTION OF THE DRAWINGS

For a more complete understanding of the present invention, reference is now made to the following descriptions taken in conjunction with the accompanying drawing, in which:

FIG. 3 shows a flow diagram of operation according to an embodiment of the present invention.

DETAILED DESCRIPTION OF THE INVENTION

The present invention is directed processing of scanned images to limit or eliminate bleedthrough in a scanned image. Accordingly, an embodiment of the present invention utilizes two-sided scanning techniques, wherein not only the front side of a document having a desired image is scanned, but the back side of the document is also scanned to provide information with respect to where bleedthrough may be present in the scanned image of the front side of the document. The information with respect to where bleedthrough may be present in the scanned image may be utilized in such embodiments with other bleedthrough criteria, such as a range of bleedthrough values determined from the scanned image, to identify individual bleedthrough pixels or bits according to an embodiment of the invention. Thereafter, the bleedthrough pixels or bits may be replaced with pixels or bits more consistent with the original scanned image. Replacement of such pixels or bits according to an embodiment of the invention utilizes pseudo-randomization of replacements in order to present a more "natural" appearance in the resulting image.

It should be appreciated that although reference is made herein to a "front" and a "back" of a document, there is no limitation with respect to a particular document orientation in using the present invention. Accordingly, references made to a front side or a back side of a document are merely relative terms and are not intended to be limiting in any way.

Figure 1A:
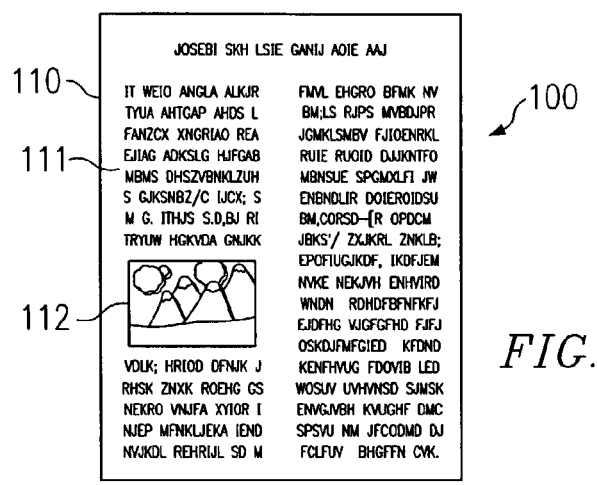
FIGS. 1A–1C show a front and back side of a document and bleedthrough appearing in a scanned image of the front side of the document.
Figure 1B:
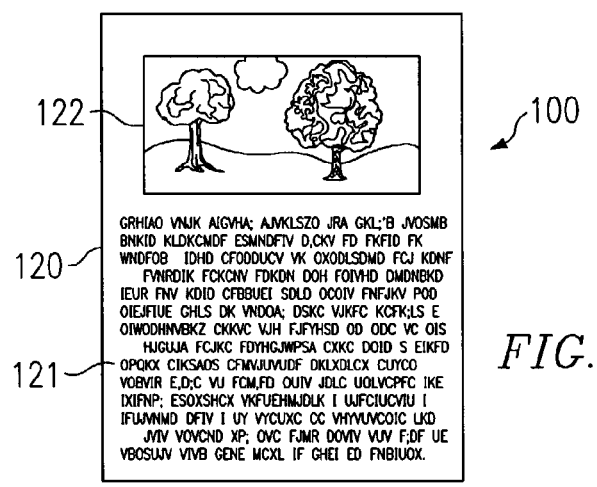
Figure 1C:
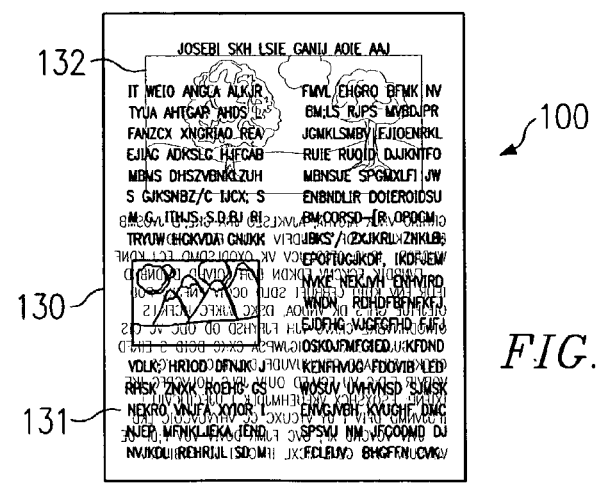

Directing attention to FIGS. 1A and 1B, the two sides of an example document 100 are shown. Specifically, document 100 comprises front side 110 (FIG. 1A) and back side 120 (FIG. 1B). The image appearing upon front side 110 includes text 111 and graphic 112. Similarly, the image appearing upon back side 120 includes text 121 and graphic 122. Document 100 may be scanned to obtain an electronic image of front side 110, such as using personal computer 210 and any of the scanners shown in FIG. 2, i.e., flat bed scanner 220, scanner with duplex automatic document feeder 230, and dual-sided scanner 240 or other scanners now known or later developed. The resulting scanned image may appear as image 130 (FIG. 1C), including not only the text and graphic of front side 110, but also bleedthrough 131 and 132 corresponding to text 121 and graphic 122, or portions thereof, of back side 120.

It should be appreciated that identifying bleedthrough appearing within a scanned image of the front side of a document using information with respect to an image appearing upon the back side of the document cannot be accomplished with a side-by-side comparison of the images. For example, a scanned image of the back side of the document would need to be "mirror-imaged," or flipped along one axis, in order to provide a proper orientation for comparative analysis of bleedthrough candidate portions of the scanned image of the front side of the document. However, further manipulation of the information with respect to the image appearing upon the back side of the document may also be useful, according to embodiments of the present invention.

Information with respect to an image appearing upon the back side of a document often will not directly correspond to bleedthrough appearing within the scanned image of the front side of the document for a number of reasons. For example, scatter associated with the media of the document itself will often result in distortion of the image from the back side of the document as seen in bleedthrough. Scatter results from the document having a finite thickness causing a slight misalignment of where an image appears upon the back side of the document and where the corresponding bleedthrough appears in the scanned image of the front side of the document. In other words, the ghost image that appears on the front side of the document will be slightly different than the image appearing on the back side of the document. The severity of the effects of scatter depend upon such variables as the thickness of the document media, the density of the document media, the opacity of the document media, the light angle, the optics used, etcetera. However, generally speaking, where a document comprises a relatively thick paper, the bleedthrough appearing in the scanned image of the front side will be slightly larger than the corresponding image on the back side due to light scattering through the page.

Another reason information with respect to an image appearing upon the back side of a document often does not directly correspond to bleedthrough appearing within the scanned image of the front side of the document includes misalignment of scanned images of the front side of the document and the back side of the document. Such misalignment may be associated with poor registration between the two scanned images, skew differences between the scanned images, and the like.

Accordingly, embodiments of the present invention address misalignment of the image appearing upon the back side of the document with the bleedthrough appearing in the scanned image of the front side of the document by analyzing alignment and skew. Such misalignment analysis may include analysis of pixels and/or groups of pixels to line up the pixels as accurately as possible from one side of the document to the other, and that they are at the same skew. For example, an embodiment of the present invention operates to obtain a scanned image of the front side of a document and a scanned image of the back side of the document, the image of the back side of the document is manipulated, e.g., mirror imaged, to correspond with potential bleedthrough appearing in the scanned image of the front side of the document, and is analyzed to correct alignment and skew. Thereafter, this information is used as a guide to verify that the regions identified as bleedthrough candidates, e.g., those areas with pixel or bit values within a bleedthrough range, are in fact bleedthrough.

Scanned images of the front and back sides of a document may be obtained in a number of ways according to the present invention. For example, a first side of the document may be scanned and then a second side of the document scanned. This may be accomplished manually, such as by an operator reversing the document in flatbed scanner 220, or automatically, such as by an automatic document feeder 231 implementing document duplexing in scanner 230. Alternatively, dual-sided optics may be utilized, such as those of dual-sided scanner 240, to obtain scanned images of the front and back sides of the document. Dual-sided scanning of a document, such as through use of dual-sided scanner 240 is less likely to experience skew and alignment errors. Moreover, some embodiments of the present invention may utilize a relatively poor quality, e.g., low resolution, scanned image of the back side of the document in identifying and reducing or removing bleedthrough. For example, an economic dual-sided scanner utilized according to the teachings of the present invention may be provided in which high resolution scanning is employed for a first side of a document and low resolution scanning is employed for the other side of the document.

According to embodiments of the present invention, a scanned image of the back side of a document is utilized to provide information with respect to where bleedthrough might be present in the scanned image of the front side of the document. Accordingly, although relatively high resolution may be desired in scanning the front side of the document, such as on the order of 300 ppi to provide reliable OCR or detailed images, relatively low resolution, such as on the order of 75 ppi, may be utilized in scanning the back side of the document to provide sufficient information with respect to where bleedthrough may appear. It should be appreciated that in addition to utilizing less complicated optical systems for providing the lower resolution scanning of the back side of the document, such embodiments optimize the use of other resources, such as memory and processing cycles, in acquiring and processing scanned images of the back side of the document while still providing desired results according to the present invention.

Where different resolutions are utilized with respect to the scanned images of the front and back sides of a document, some embodiments of the present invention scale down the higher resolution to match that of the lower resolution for bleedthrough analysis, because it has been found that the regions of bleedthrough can be identified with acceptable accuracy even at such lower resolutions. Specifically, embodiments of the invention operate to correlate candidate areas of bleedthrough on the front side of the document with physical presence of ink on the back side of the document. Accordingly, the particular size of the pixel utilized in determining correlation is a design choice which may be made based upon such considerations as a pixel size determined to provide sufficient information to identify bleedthrough according to embodiments of the invention.

Figure 2:
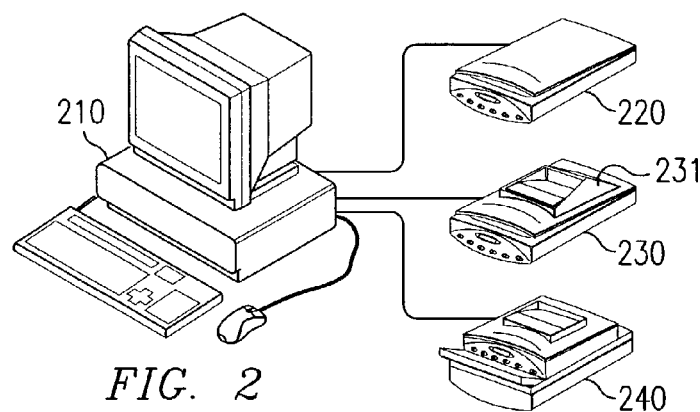
FIG. 2 shows a system for scanning a document, such that shown in FIGS. 1A and 1B, that is adapted according to an embodiment of the present invention.

Directing attention to FIG. 3, flow diagram 300 sets forth operation of an embodiment of the present invention to identify and remove bleedthrough in a scanned image. It should be appreciated that the steps of flow diagram 300 may be implemented in the form of scanner firmware and/or software as may be operable within processor-based systems, such as personal computer 210 (FIG. 2), computer 400 (FIG. 4), and/or scanners 220–240 (FIG. 2). Additionally or alternatively, steps of flow diagram 300 may be implemented as firmware and/or software operable remote to a scanner obtaining the images, such as a network terminal, an Internet web server, or the like.

The illustrated embodiment of the invention initiates at step 301. Initiation of the steps of flow diagram 300 may, for example, be manually initiated by a user or automatically initiated by a scanning or image processing operation.

At step 302, scanned images of the front side of a document (e.g., front side 110) and of the back side of a document (e.g., back side 120) are obtained. For example, scanned images of the front and back sides of the document may be obtained simultaneously by a scanner equipped with dual-sided optics, such as scanner 240 having two CCD arrays, one disposed above and one below the path of the paper, with accompanying optics. Alternatively, scanned images of the front and back sides of the document may be obtained sequentially by a scanner equipped to provide dual-sided scanning, such as scanner 230 having an automatic document feeder providing a paper-directing pathway that flips the page between sequential passes. Similarly, scanned images of the front and back sides of the document may be obtained sequentially by a scanner equipped to provide single-sided scanning, such as scanner 220 wherein an operator manually presents both sides of the document for scanning.

Embodiments of the present invention may be implemented as a stand alone application or as a part of another application, such as to provide enhanced functionality to an image processing application. Accordingly, the desired resolution, bit depth, size, etc., utilized in scanning the images may be determined automatically by accompanying scanning software designed for that task.

The scanned images of step 302 may be obtained by instigating a scanning process or scanning processes under control of the present invention. Additionally or alternatively, embodiments of the present invention may utilize scanned images previously obtained, such as for another purpose. For example, where the entire contents of a work are being scanned for digitizing, scanned images of both the front side and back side of pages thereof may be presented for digitization. Preferably, information with respect to which images are associated as front and back of a page is provided or can be determined. Embodiments of the present invention may utilize the scanned images in identification and/or removal of bleedthrough as described herein.

It should be appreciated that, where scanned front and back images are acquired for other purposes, the resolution of both front and back images may be high, such as to accommodate OCR of both sides. However, as previously described, high resolution scanned images are not required in determining bleedthrough to an acceptable certainty according to the present invention. Accordingly, although the resolution of the images obtained may be the same, embodiments of the present invention may reduce the resolution of the images as processed for aspects of the bleedthrough determination, such as to minimize memory usage and/or to optimize processor performance. For example, where an "automatic" bleedthrough analysis mode (e.g., accepting little or no user input in bleedthrough analysis) is selected, the resolution of the scanned images may be lowered for bleedthrough analysis according to the present invention, such as to 75 ppi, although a higher scanned resolution, such as 300 ppi, is utilized with respect to image processing for other purposes, such as OCR processing. However, in situations where image previews are presented to a user for bleedthrough analysis, for example, the originally scanned resolution might be utilized according to the present invention.

The scanned images of corresponding front and back sides of the document may be stored along with their relevant metadata. Such metadata may include information with respect to the height, width, bit depth, x-axis and y-axis resolution, and/or the like. Embodiments of the present invention utilize such data in comparing or otherwise processing the image data. For example, the metadata may be utilized in reducing the resolution of one image to match that of the other image for bleedthrough pixel analysis.

Step 303 of the illustrated embodiment compares the resolution of the corresponding front and back image scans. Comparison of the resolution may include comparison in both the x-axis and y-axis directions. Although the comparison of step 303 is optional according to the present invention, i.e., the embodiment may automatically use a same-resolution for the front and back scans, it is included in the illustrated embodiment to accommodate different resolutions for the front and back scans.

The use of different resolutions in the two scans may be desirable according to some embodiments of the invention. For example, the optics may differ on the two sides of the scanner (and in fact may be simplified on one side, providing only modest resolution if the second side scan is only used for the purpose of this invention), preventing the second side from achieving the same resolution as the first side. Moreover, memory usage is saved by not performing the back side scan at as high of a resolution (and/or bit depth) as the front side, especially if it is only to be used for the purpose of this invention (that is, the actual data on the back side is not of interest to the user). Accordingly, any situation in which the scanned image of the back side of a document is only to be used for possible bleedthrough detection and removal may potentially benefit from the use of lower resolution scans thereof.

Additionally, in situations where the scanned images of the two sides contain different data types, are to be used at different destinations or in different end applications, etcetera, a scanner may provide corresponding scanned images of differing resolution. For example, the second side of a document may comprise a photo and the first side comprise text (i.e., different data types). Accordingly, the two sides may differ in their "optimal" settings for scanning, here the first side generally requiring greater pixels per inch than the second side, and the second side generally requiring greater bit depth than the first side.

If both corresponding scanned images are not of the same resolution, processing according to the illustrated embodiment proceeds to step 304. However, if both corresponding scanned images are of the same resolution, processing according to the illustrated embodiment proceeds to step 305.

At step 304, the scanned image with the greater resolution (highest ppi) is scaled down to match or approximate the resolution of the scanned image with the lower resolution (lower ppi). Scaling down the resolution of the higher resolution scanned image is performed according to the illustrated embodiment because, for example, it is faster and/or less processor-intensive to compare two smaller files than two larger files. Additionally, scaling down may be accomplished in such a way as to provide a smoothing step and be less likely to introduce undesirable artifacts than would result from scaling up. For example, a "nearest neighbor" transform (averaging from the pixels or parts of pixels making up the scaled pixel) may be utilized to provide scaling that smoothes the higher resolution image.

It should be appreciated that although scaling down of a higher resolution image is discussed according to the illustrated embodiment, the present invention preferably does not lose any information with respect to the image. For example, the higher resolution image of the document is retained and a scaled-down-in-resolution image is made for bleedthrough pixel identification according to an embodiment of the present invention. Having identified bleedthrough pixels according to the present invention, a bleedthrough pixel map may then be scaled up to the original image's resolution for removal and replacement of bleedthrough pixels.

At step 305 of the illustrated embodiment the scanned image or images are tested for bleedthrough. The front side, or both sides if each side is intended for some use beyond the present invention, may be evaluated at step 305 to determine if bleedthrough is present in the image. For example, algorithms of the present invention may operate to examine scanned images to provide information for a determination with respect to the presence of bleedthrough. Accordingly, pixel patterns may be analyzed to detect a presence of a particular ratio of pixels having an attribute, such as intensity, gray scale level, random placement pattern, etcetera, present in the scanned image. According to one embodiment, bleedthrough candidate pages, or portions of pages, may be automatically identified by identifying a white point in the scanned image, determining a number or percentage of pixels having an intensity or gray scale value within a predetermined range of this white point, and, if that number or percentage exceeds a threshold, designating the scanned image as potentially including bleedthrough.

For example, a histogram (array with as many elements as the bit depth allows, $2^N$ elements where N=number of bits of depth; e.g. 256 for 8-bit scanning) of the intensities (values representing "whiteness") of the pixels in the scanned image may be obtained. Specifically, a histogram providing a bit count of the number of bits having each level of intensity may be formed.

A white point for the scanned image may be found through analysis of this histogram. For example, the white point may be determined to be the pixel intensity or level of whiteness corresponding to the histogram element at which 95%, or some other portion, of the histogram pixels are more dark and 5%, or some other portion, of the histogram pixels are more light. Similarly, a black point for the scanned image may be found through analysis of the histogram. For example, the black point may be determined to be the pixel intensity corresponding to the point at which 5%, or some other portion, of the histogram pixels are more dark and 95%, or some other portion, of the histogram pixels are more light.

Where the most white point is $2^N-1$ (e.g., 255 for 8 bit depth pixels) and the most black point is 0, a typical white point identified above may be at 85–99% of this range (e.g., between 217–252 when 8 bit depth is used) A typical black point identified above may be at 0–40% of this range (e.g., between 0 and 102 when 8 bit depth is used). A typical black point will generally be closer to 0 if there are photos on the page, and closer to 100 if there is only regularly-sized text on the page.

It should be appreciated that auto-exposure techniques may be applied to the histogram, if desired. For example if an image is under-exposed resulting in the white point being at pixel intensity 200 and the black point being at pixel intensity 100 (in an 8 bit depth 0–255 range), auto-exposure techniques may be applied to stretch out the white point to black point range, such as to extend from 50 to 225 and thereby provide a somewhat normalized white point and/or black point.

Having identified a white point in the scanned image, a "peak" in the histogram around the white point may be obtained to establish a boundary for identification of bleedthrough pixels. For example, the histogram may be "smoothed" (e.g., using a moving average filter) and the resulting smoothed histogram analyzed to locate inflection points surrounding the white point. A white peak may be defined between the two inflection points. Additionally or alternatively, a black point identified in the scanned image may be utilized to obtain a "peak" in the histogram for identification of bleedthrough pixels, substantially as described with respect to the white point. Such white and black points are also referred to herein as reference tone points.

Smoothing of the histogram is utilized according to some embodiments of the present invention because histograms, particularly those associated with scanned images from low quality scanners, tend to be choppy. Specifically, a histogram will tend to have a large number of pixels at one pixel value, then no or very few pixels for several pixel values, then a large number of pixels at another pixel value, and so on. Such histogram choppyness often results from a low-quality scanner scaling up the scan from a lower number of bits, such as 4 or 5 bits, to a higher number of bits, such as 8 bits. Smoothing according to embodiments of the present invention more evenly distributes the bit counts among the pixel values to result in a histogram easier to analyze for peaks.

A "peak" in the histogram corresponding to bleedthrough may be identified, such as a peak in the histogram just below the white peak. Bleedthrough peaks are searched for, according to embodiments of the present invention, in the upper fourth of the range between the black point and the lower end of the white peak, e.g., within 25% of the white peak. For example, if the white peak is from 230–245 (in an 8 bit depth histogram) and the black point is 80, then the bleedthrough search range will be below 230 but well above 80. Accordingly, searching the upper fourth of the black point to lower white peak point range, or 192–230, for a "bleedthrough" peak, may be appropriate according to an embodiment of the present invention. It should be appreciated that the low end of this search range is appropriate because, if bleedthrough is actually darker than the lower end of this range, it will be difficult to remove the bleedthrough without deleteriously affecting text quality or other image attributes. Such bleedthrough severity is rare, resulting from very poor quality paper, overly-powerful scanning illumination, etc. Moreover, setting this lower end of the range at 75% of the distance toward the white point from the black point avoids identifying light text as bleedthrough, such as may appear at approximately one-third to one-half of the way between the white and black points due to very fast throughput scanning. The upper end of the search range is appropriate because bleedthrough should be below the white peak.

In practice it has been discovered that many bleedthrough peaks are partially or completely hidden by the white peak. Thus, if no bleedthrough peak is identified other techniques may be used to establish a bleedthrough range. For example, the range for bleedthrough search may be set to the width of the white peak, but offset half of the white peak range darker, according to an embodiment of the invention. Accordingly, if the white range is 230–245, and no bleedthrough peak is found, the bleedthrough range may be set to 222–237.

Once a bleedthrough range is either identified or calculated, each of the pixels whose intensity value falls into the bleedthrough range may be mapped in a separate representation (or "mapping") of the scanned image, according to an embodiment of the present invention. Such a mapping may present a simple (e.g., binary) matrix representation of the portion of the scanned image where putative bleedthrough bits are located. The mapping of the scanned image, that from a memory standpoint and a performance standpoint uses very little space in memory, may be analyzed to determine if bleedthrough exists according to embodiments of the present invention.

At step 306 of the illustrated embodiment a determination is made as to whether the scanned image includes bleedthrough. Experimentation has revealed that the aforementioned mappings of putative bleedthrough pixels will often provide recognizable attributes when bleedthrough is actually present. For example, the bleedthrough pixels of the mapping will tend to be clustered together into larger regions where solid regions, such as a large block of text or a photo, on the back side of the document have bled through. Additionally, the bleedthrough pixels of the mapping will tend to represent a large percentage of the pixels in the histogram where there is actually bleedthrough, such as where text from the back side has consistently bled through.

Accordingly, embodiments of the present invention analyze the aforementioned mapping in multiple ways so as to recognize bleedthrough associated with various situations. Using the mapping provided by step 305 described above, it may be concluded that bleedthrough is present in the scanned image if the pixels of the mapping tend to cluster into relatively large regions, such as regions larger than expected by a random distribution. Additionally or alternatively, if the pixels of the mapping represent a significant percentage of the pixels in the histogram (e.g. >2.5% of the pixels in the page), then it may be concluded that bleedthrough is present in the scanned image. Although any threshold amount may be utilized according to the present invention in determining the presence of bleedthrough, 2.5% has been empirically determined to typically be well below the amount of bleedthrough that results from a back side that is substantially all text. In such a situation, if there is less than about 2.5% of putative bleedthrough pixels in the scanned image of the front side of the document, there is probably not a significant amount of bleedthrough, but rather the gray values and transitions from black to white on the front side have been identified as putative bleedthrough pixels.

It should be appreciated that implementation of the algorithms described above with respect to steps 305 and 306 provide for determination of the presence of bleedthrough without operator intervention (i.e., provide for "automatic" determinations) and may be particularly useful when the user wants to remove bleedthrough on pages that have significant bleedthrough and likely poor visual quality as a consequence. However, the present invention is not limited to use of the particular methodology described above. Accordingly, various methodologies, and combinations thereof, for testing for and/or determining the presence of bleedthrough may be utilized according to the present invention.

According to embodiments of the invention, an operator may identify particular scanned images as bleedthrough candidates. For example, a preview/review window may be presented for an operator to view the scanned image and determine if bleedthrough is present. It should be appreciated that many pages with bleedthrough have only minor bleedthrough effects on appearance, and little to no effect on such tasks as OCR. Accordingly, operator input may be useful to choose from a panoply of processes to be applied to the image depending upon circumstances. Such operator input may be utilized in the alternative to the aforementioned algorithms for automated determination of bleedthrough or in combination therewith. For example, the values utilized in the automated determination may be adjusted to result in over-inclusive determinations with respect to bleedthrough, and an operator may be presented with scanned images determined to be bleedthrough candidates for a final determination. Alternatively, an operator may be presented with all scanned images for a bleedthrough determination, if desired.

Alternatively, every page may be flagged or defaulted as a bleedthrough candidate, to make sure bleedthrough identification and removal steps are applied to every scanned image. This may be preferable in situations where removing bleedthrough is highly desirable.

Irrespective of how a determination with respect to bleedthrough in a scanned image is made at step 306 (e.g., whether determined by automatic algorithms, operator input, or default), processing with respect to a scanned image having bleedthrough proceeds to steps 307–309, according to the illustrated embodiment. However, processing with respect to there being no bleedthrough in a scanned image, as determined at step 306, proceeds to step 310.

At step 307, the two corresponding scanned images, e.g., a front image and a corresponding back image, are manipulated with respect to each other so that the pixels on the backside that may be causing bleedthrough on the front side are aligned. Usually, this will at least involve "flipping" the back side image (rotating it around its y-axis if the optics have already corrected for direction of light) so that the back side would be readable as a "mirror image," corresponding to the portion of the back side showing through on the front side image.

Additional manipulation of the scanned images may be utilized to compensate for errors associated with alignment, skew, scatter, etcetera. In the case of simultaneous scanning, the pixels may already be sufficiently aligned, and so no processing with respect to alignment and/or skew may be necessary. However, if the two scanned images have been scanned independently (i.e., not simultaneously), then one document may be misaligned (i.e., its x- and/or y-origin are different) with respect to the other. For example, the scan of the document may not begin at the same point for each side of the document, such as due to the document not being placed in the scanner in the same way from scan to scan, resulting in misalignment from side to side. Similarly, the scanning software utilized in obtaining the scanned images may align the data that comes off of the page such that a mirror image of the back side scanned image will not properly line up with the scanned image of the front side. Also, one document may be skewed with respect to the other. For example, a feed roller may slip or catch the document being scanned, resulting in the document not being fed through the scanner squarely along one of the document's axes. Accordingly, embodiments of the present invention provide correction for alignment and skew errors.

Differential skew and misalignment may be corrected according to embodiments of the present invention using evidence of bleedthrough as determined for one of the scanned images. For example, a map (e.g., a binary pixel map of the same dimensions as the two images) of the putative bleedthrough pixels may be made for one of the scanned images (e.g., whichever scanned image has the "best evidence" for bleedthrough). The pixels of the bleedthrough mapping may be aligned with a pixel map from the corresponding side to identify a relative position having a highest correlation. For example, a black pixels map (threshold map of pixels below the bleedthrough range, e.g. 0–221 in the above example) from the scanned image of the back side may be compared with the bleedthrough map from the scanned image of the front side to correct for skew and alignment.

It should be appreciated the mapping of bleedthrough pixels as may be utilized according to this embodiment of the present invention may already be available from testing of the scanned image for bleedthrough, as discussed above with respect to step 305 of the illustrated embodiment. Accordingly, although perhaps not used to determine if bleedthrough is present in the aforementioned operator input and default bleedthrough determination embodiments, pixel analysis, such as that described above with respect to step 305 above, may still be implemented.

Projection profile methods (as are well-known in the art), wherein pixels of a particular attribute associated with each of the corresponding scanned images are counted in the X and Y directions and lined up, may be utilized for skew correction and alignment according to the present invention. For example, skew may be tested over the range of −5 to +5 degrees, such as in increments of 0.1 or 0.2 degrees. Of course, other skew and alignment techniques may be utilized according to the present invention, such as Hough transforms, if desired. The highest correlation between the maps of the two scanned images will correspond to when they are best corrected for skew and when they are best aligned.

If no acceptable correlation occurs (e.g. there is no obvious "peak" in the correlation coefficient around the "best" skew corrected and alignment values) it is an indication that there is no bleedthrough to correct. Accordingly, it should be appreciated that operation of the steps of the illustrated embodiment provide a check on the bleedthrough determinations made therein.

After applying the techniques described above with reference to step 307 of the illustrated embodiment, each pixel (x,y) in the front side scanned image is aligned with the pixel that underlies it on the back side scanned image. It should be appreciated that, an exact alignment might not be accomplished due to such things as scatter. However, the embodiments of the present invention provide correction of the relative orientation of each of the corresponding sides using a highest correlation that, statistically, mitigates errors associated with scatter. Moreover, the use of the lower-level resolution for comparison of the corresponding images, as discussed above, further diminishes the effects of scatter. Accordingly, the embodiments of the present invention described herein operate to provide compensation for the effects of scatter in the end result.

At step 308, the illustrated embodiment provides identification of bleedthrough pixels for subsequent replacement to provide better visual quality. For example, for the scanned image of the front side of the document, all pixels in the bleedthrough range (e.g. 222–237 in the above example) may be marked in a bleedthrough map (referred to herein as Map 1), that may already have been created in association with the techniques implemented in step 305 as described above. For the scanned image of the back side of the document, all pixels darker than the bleedthrough range (e.g. 0–221) may be marked in a back side skew and alignment corrected map (referred to herein as Map 2). Any pixel positions in Map 1 (the bleedthrough map) marked as containing a putative bleedthrough pixel that are not also marked in Map 2 (the back side map) are deleted from Map 1, according to embodiments of the present invention, as these pixels correspond to "false positives" for bleedthrough. Such false positives will often occur within images or on the edges of text and drawings in the scanned image of the front side, because such areas often include transition pixels (e.g., gray pixels traversing the scale between black and white of the edge).

Although the bleedthrough map resulting from the technique above provides a relatively accurate representation of bleedthrough pixels, it should be appreciated that it does not account for all potential sources of false positives. For example, areas in which the front image includes information, having pixels within the bleedthrough pixel value, at a position corresponding to an area on the back side where information is present may result in false positives. Accordingly, embodiments of the present invention further process the pixels of Map 1 to further eliminate the occurrence of false positive identification of bleedthrough pixels.

One such further process identifies regions, such as polygonal regions identified using box-bounding techniques, where regions smaller than a threshold value will be deleted from Map 1. This results in small regions, such as may be associated with slight variances in the scanning, dust, dirt small particles, copy machine marks, etcetera, that are unlikely to be large enough to be text regions and, therefore, unlikely to have a deleterious impact on the visual impression, be ignored (i.e., removed from Map 1 and, therefore, not subject to being replaced). For example, where 75×75 ppi is utilized in analyzing the scanned images, areas of less than 4 pixels by 4 pixels (areas of less than 16 pixels) may be deleted as having been false positives and/or areas of insubstantial bleedthrough.

Another process may operate to thin some or all of the remaining regions of bleedthrough pixels in Map 1. For example, regions that are less than a predetermined number of pixels wide (in the X or Y direction) may be reduced in thickness, such as by some factor of the predetermined number of pixels (e.g., one quarter, one half, three quarters) or even deleted entirely. In the 75×75 ppi example used herein, the predetermined number of pixels may be 2, such that any region, or portion thereof, of bleedthrough pixels in Map 1 less than 2 pixels, when looking at run lengths, will be removed from the map. This technique is useful in avoiding false positives associated with transitions at edges of image features, e.g., gray pixels appearing at the edge of text characters that fall into the bleedthrough range although they are not associated with bleedthrough, and is particularly useful in avoiding the "ransom note" effect described above.

Another process may determine the number of bleedthrough pixel regions and/or area associated with bleedthrough pixels, such as after the above processes have processed Map 1. If there are very few regions identified in Map 1 (e.g. less than 50 regions and/or less than 0.5 square inches total for the regions for a letter sized image) it may be concluded that no or insubstantial bleedthrough is present in the scanned image and, therefore, Map 1 (the bleedthrough pixel map) may be completely cleared of pixels (i.e., no bleedthrough pixel removal/replacement will take place).

According to the illustrated embodiment, any pixels remaining in Map 1 are identified as bleedthrough pixels, and are subject to being replaced by operation of step 309. Accordingly, if any bleedthrough pixels remain in Map 1, Map 1 and the bleedthrough pixels may be scaled up to the scanned document's original resolution (pixels-per-inch) for replacement according to embodiments of the invention. However, before such scaling up and replacement of bleedthrough pixels, embodiments of the invention "fatten" the bleedthrough pixel regions to soften the visual impact of their replacement. For example, each region of pixels remaining in Map 1, or some subset thereof such as those having an area exceeding a predetermined number of pixels, are processed to add pixels thereto. According to one embodiment wherein 75×75 ppi is used, bleedthrough pixel regions of Map 1 are fattened according to the present invention by adding 1 pixel to each edge of the region. Accordingly, a 4×4 pixel region would be fattened according to this embodiment of the invention to a 6×6 pixel region. This expansion of the bleedthrough pixel regions ensures that boundary pixels that transition between the bleedthrough and the non-bleedthrough areas, although perhaps not falling within the bleedthrough range established above, are also replaced according to the present invention, thus avoiding the appearance of a thin outline where a transition from the bleedthrough replacement to the non-bleedthrough replacement occurs.

At step 309 of the illustrated embodiment, bleedthrough pixels, such as those identified in Map 1, may be replaced with quasi-random white pixels, such as white pixels quasi-randomly selected from the probability distribution for the white peak (e.g. 230–245 in the example above). The "quasi-randomness" of one embodiment of the above approach results from the same distribution (mean, standard deviation, etc.) being used with respect to the replaced pixels as is found in the white pixels of the white peak.

It should be appreciated that other techniques for bleedthrough pixel replacement may be implemented according to the present invention. For example, embodiments of the invention may scale the replaced pixels slightly black as they approach black pixels outside the bleedthrough area and slightly white as they approach white pixels outside the bleedthrough area.

Likewise, there is no limitation that the present invention be utilized to only remove bleedthrough in areas of white or be utilized with monochrome images. Embodiments of the present invention operate to replace bleedthrough pixels with pixels that are representative of the background over which they lie. For example, the scanned image may be analyzed to determine the background color in an area in which bleedthrough pixels are to be replaced in order to provide appropriately colored pixels as replacements. According to one embodiment of the invention, a zoning algorithm, or page-analysis algorithm, is utilized to provide information with respect to scanned image background color using a zoning engine that can identify uniform backgrounds that are non-white. Use of such a zoning algorithm may be useful in situations where, for example, a box having a non-white background surrounds a portion of text in the scanned image. Other techniques for replacing bleedthrough pixels with appropriately colored pixels useful according to the present invention may include analysis of the neighborhood around a bleedthrough pixel for average and standard deviation of pixels, using this information to drive the replacement pixel determination.

At step 310 of the illustrated embodiment, a determination is made as to whether additional documents are to be processed for bleedthrough pixel removal according to the present invention. If the present invention is to be operated with respect to additional documents, processing may return to step 302 for bleedthrough pixel identification and removal as described above. However, if additional documents are not present, processing may terminate at step 311.

When implemented in software, the elements of the present invention are essentially the code segments or logic to perform the necessary tasks, such as the steps of flow diagram 300 discussed above. The program or code segments can be stored in a processor-readable, or computer readable, medium or transmitted by a computer data signal embodied in a carrier wave, or a signal modulated by a carrier, over a transmission medium. The "processor-readable medium" may include any medium that can store or transfer information. Examples of the processor-readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate via a transmission medium such as electronic network channels, optical fibers, air, electromagnetic, RF links, etc. The code segments or logic may be downloaded via computer networks such as the Internet, Intranet, etc.

Figure 4:
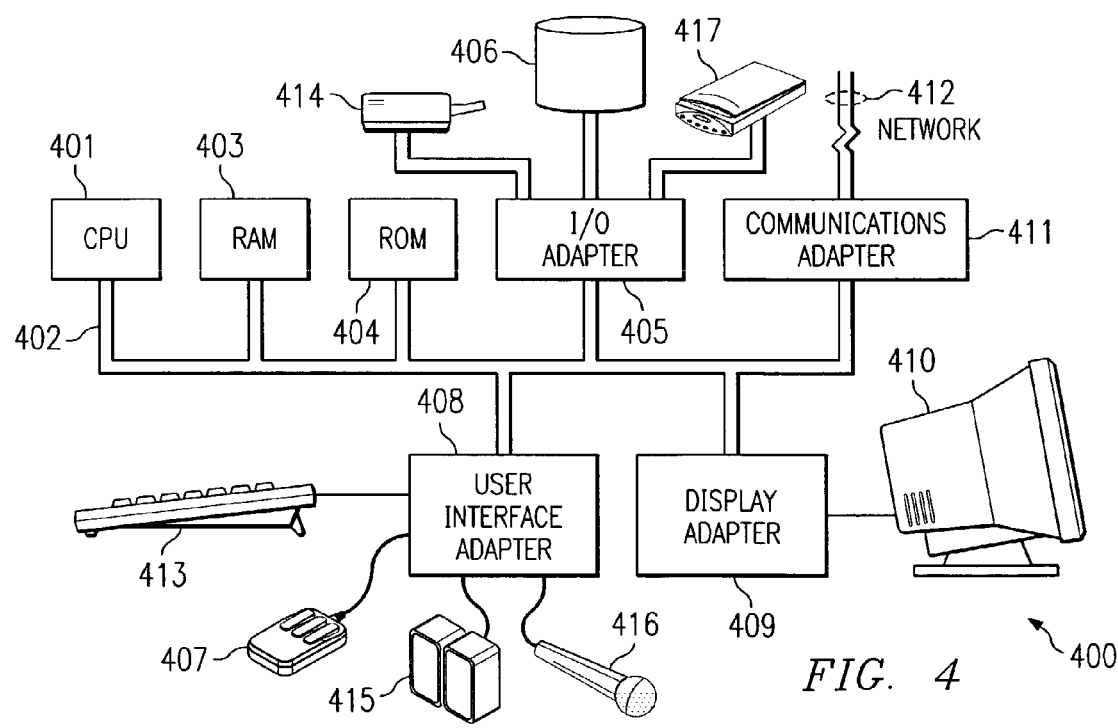
FIG. 4 shows an exploded diagram of a computer system, such as that shown in FIG. 2, that is adapted according to an embodiment of the present invention.

FIG. 4 illustrates computer system 400, such as may correspond to personal computer 210 of FIG. 2, adapted to use the present invention. Central processing unit (CPU) 401 is coupled to system bus 402. The CPU 401 may be any general purpose CPU, such as an Hewlett Packard PA-8500 or Intel Pentium processor. However, the present invention is not restricted by the architecture of CPU 401 as long as CPU 401 supports the inventive operations as described herein. Bus 402 is coupled to random access memory (RAM) 403, that may be SRAM, DRAM, or SDRAM. ROM 404 is also coupled to bus 402, that may be PROM, EPROM, or EEPROM. RAM 403 and ROM 404 hold user and system data and programs as is well-known in the art.

Bus 402 is also coupled to input/output (I/O) controller card 405, communications adapter card 411, user interface card 408, and display card 409. The I/O adapter card 405 connects to storage devices 406, such as one or more of a hard drive, a CD drive, a floppy disk drive, a tape drive, to the computer system. The I/O adapter 405 is also connected to printer 414, that would allow the system to print paper copies of information such as document, photographs, articles, etc. Note that printer 414 may a printer (e.g. dot matrix, laser, etc.), a fax machine, or a copier machine. The I/O adapter 405 is further connected to scanner 417, that would allow the system to acquire digital images and/or information from printed paper copies of information such as documents, photographs, articles, etc. Note that the scanner may be provided in various embodiments, including a sheet fed scanner, a flatbed scanner, a handheld scanner, a digital camera, and a video camera, such as may correspond to scanners 220–240 of FIG. 2. Communications card 411 is adapted to couple the computer system 400 to a network 412, that may be one or more of a telephone network, a local (LAN) and/or a wide-area (WAN) network, an Ethernet network, and/or the Internet network. User interface card 408 couples user input devices, such as keyboard 413, pointing device 407, and microphone 416, to the computer system 400. User interface card 408 also provides sound output to a user via speaker(s) 415. The display card 409 is driven by CPU 401 to control the display on display device 410.

It should be appreciated, although particular embodiments have been described herein in order to aid in the understanding of the concepts of the present invention, that the invention is not limited to the embodiments described. For example, reference has been made to removal of bleedthrough pixels appearing within the image of a front side of a document using information with respect to the back side of the document. However, there is no limitation to the use of the present invention with any particular side of a document. Accordingly, embodiments of the present invention may be utilized in removing bleedthrough in images associated with a back side of a document as well as both the front and back side of a document.

Similarly, embodiments have been described herein with reference to images having 75 ppi resolution. However, one of ordinary skill in the art will readily appreciate that the concepts of the present invention are well-suited for application to images of different resolutions, such as 150 ppi, 300 ppi, 600 ppi, etcetera. According to one embodiment of the present invention, values described herein with respect to images of 75 ppi may be scaled to provide similar operation with respect to images having a different resolution. For example, and not by way of limitation, processing of regions of putative bleedthrough pixels to determine if they should be removed from the bleedthrough pixel map (Map 1), as discussed above, may be scaled from regions smaller than 4 pixels by 4 pixels for 75 ppi to 8 pixels by 8 pixels for 150 ppi.

It should be further appreciated that the present invention is not limited to the steps set forth in the illustrated embodiment. Accordingly, additional or alternative steps may be implemented in providing features and functionality according to the present invention. For example, the particular document being scanned, e.g., quality of paper stock, type of document, format of the document, etcetera, can affect the bleedthrough resulting from a scan. Embodiments of the present invention may query an operator with respect to the document being scanned in order to provide desired bleedthrough identification and removal. For example, pre-established preferences, such as bleedthrough range relative to white/black point, number and/or type of additional processes used for false positive bleedthrough pixel identification, size of bleedthrough regions to ignore, percentage of bleedthrough pixels in a document to accept without removal, number of pixels to fatten, and the like, may be utilized with respect to particular document types and/or content. Of course, such preferences may be automatically selected based upon analysis of the document and/or its content, such as by optic qualities, weight, thickness, opacity, and/or format detecting means, if desired.

What is claimed is:

1. A method for processing bleedthrough in an image, said method comprising:
   identifying putative bleedthrough pixels in a first image;
   mapping said putative bleedthrough pixels into a putative bleedthrough representation of said first image; and
   processing said putative bleedthrough pixel mapping to remove false positive bleedthrough pixels therefrom.

2. The method of claim 1, wherein said processing said putative bleedthrough pixel mapping comprises comparing information with respect to a second image to said putative bleedthrough pixel mapping and removing putative bleedthrough pixels from said mapping where there is no corresponding pixel in said second image.

3. The method of claim 2, further comprising, before said comparing said information with respect to said second image to said putative bleedthrough pixel mapping, scaling a resolution of one of said first and second images having a higher resolution down to a resolution of the other one of said first and second images.

4. The method of claim 2, wherein said comparing said information with respect to second image to said putative bleedthrough pixel mapping comprises alignment and skew adjusting said information with respect to said second image for said comparing with said putative bleedthrough pixel mapping.

5. The method of claim 1, wherein said processing said putative bleedthrough pixel mapping comprises deleting regions of putative bleedthrough pixels in said mapping smaller than a threshold value from said putative bleedthrough pixel mapping.

6. The method of claim 1, wherein said processing said putative bleedthrough pixel mapping comprises thinning regions of putative bleedthrough pixels in said mapping to thereby remove a portion of said regions.

7. The method of claim 1, further comprising fattening regions of putative bleedthrough pixels in said mapping to thereby soften a visual impact associated with replacing pixels of said first image corresponding to said putative bleedthrough pixels.

8. The method of claim 1, further comprising replacing pixels of said first image corresponding to putative bleedthrough pixels of said mapping using quasi-random replacement pixels.

9. The method of claim 8, wherein said quasi-random replacement comprises using a distribution of a first type of pixels of said first image with respect to the replaced pixels.

10. A method for removing bleedthrough from an image, said method comprising:
    scanning a document to provide an electronic first image;
    scanning said document to provide an electronic second image, wherein said first and second images are associated with juxtaposed sides of said document;
    generating a putative bleedthrough pixel mapping for said first image;
    processing said putative bleedthrough pixel mapping using information with respect to said second image; and
    replacing pixels of said first image corresponding to putative bleedthrough pixels of said mapping.

11. The method of claim 10, wherein said scanning to provide said first image and said scanning to provide said second image are at different resolutions.

12. The method of claim 11, further comprising scaling a resolution of one of said first and second images having a higher resolution down to a resolution of the other one of said first and second images.

13. The method of claim 10, wherein said processing said putative bleedthrough pixel mapping removes false positive bleedthrough pixels therefrom.

14. The method of claim 10, wherein said processing said putative bleedthrough pixel mapping comprises comparing information with respect to said second image to said putative bleedthrough pixel mapping and removing putative bleedthrough pixels from said mapping where there is no corresponding pixel in said second image.

15. The method of claim 14, wherein said comparing said information with respect to said second image to said putative bleedthrough pixel mapping comprises alignment and skew adjusting said information with respect to said second image for said comparing with said putative bleedthrough pixel mapping.

16. The method of claim 10, wherein said processing said putative bleedthrough pixel mapping comprises deleting regions of putative bleedthrough pixels in said mapping smaller than a threshold value from said putative bleedthrough pixel mapping.

17. The method of claim 10, wherein said processing said putative bleedthrough pixel mapping comprises thinning regions of putative bleedthrough pixels in said mapping to thereby remove a portion of said regions.

18. The method of claim 10, wherein said replacing pixels of said first image comprises using quasi-random replacement pixels to replace said pixels of said first image corresponding to said putative bleedthrough pixels.

19. The method of claim 18, wherein said quasi-random replacement comprises using a distribution of a first type of pixels of said first image with respect to the replaced pixels.

20. The method of claim 10, further comprising fattening regions of putative bleedthrough pixels in said mapping to thereby soften a visual impact associated with replacing pixels of said first image corresponding to said putative bleedthrough pixels.

21. The method of claim 10, further comprising analyzing said putative bleedthrough pixel mapping to determine if bleedthrough is present in said first image.

22. A computer program product having a computer-readable medium having computer program logic recorded thereon for removing bleedthrough from an image, said computer program product comprising:
    code for generating a putative bleedthrough pixel mapping for a first image;
    code for processing said putative bleedthrough pixel mapping using information with respect to a second image, wherein said first image and said second image are associated with juxtaposed sides of a document; and
    code for replacing pixels of said first image corresponding to putative bleedthrough pixels of said mapping.

23. The computer program product of claim 22, wherein said first image and said second image are at a different resolution, and further comprising code for scaling a resolution of one of said first and second images having a higher resolution down to a resolution of the other one of said first and second images.

24. The computer program product of claim 22, wherein said cod for processing said putative bleedthrough pixel mapping removes false positive bleedthrough pixels therefrom.

25. The computer program product of claim 22, wherein said code for processing said putative bleedthrough pixel mapping comprises code for adjusting alignment and skew of said information with respect to said second image for said comparing with said putative bleedthrough pixel mapping.

26. The computer program product of claim 25, wherein said code for processing said putative bleedthrough pixel mapping comprises code for comparing said alignment and skew adjusted information with respect to said second image to said putative bleedthrough pixel mapping and removing putative bleedthrough pixels from said mapping where there is no corresponding pixel in said second image.

27. The computer program product of claim 25, wherein said code for processing said putative bleedthrough pixel mapping further comprises code for deleting regions of putative bleedthrough pixels in said mapping smaller than a threshold value from said putative bleedthrough pixel mapping.

28. The computer program product of claim 15, wherein said code for processing said putative bleedthrough pixel mapping further comprises code for thinning regions of putative bleedthrough pixels in said mapping to thereby remove a portion of said regions.

29. The computer program product of claim 22, wherein said code for replacing pixels of said first image comprises code for using quasi-random replacement pixels to replace said pixels of said first image corresponding to said putative bleedthrough pixels, wherein said quasi-random replacement comprises using a distribution of a first type of pixels of said first image with respect to the replaced pixels.

30. The computer program product of claim 22, further comprising code for fattening regions of putative bleedthrough pixels in said mapping to thereby soften a visual impact associated with replacing pixels of said first image corresponding to said putative bleedthrough pixels.

31. The computer program product of claim 22, further comprising code for analyzing said putative bleedthrough pixel mapping to determine if bleedthrough is present in said first image.

32. A system for removing bleedthrough from an image, said system comprising:
    means for generating a putative bleedthrough pixel mapping for a first image;
    means for comparing information with respect to a second image to said putative bleedthrough pixel mapping; and
    means for replacing pixels of said first image corresponding to putative bleedthrough pixels of said mapping using replacement pixels.

33. The system of claim 32, wherein said replacement pixels comprise quasi-random pixels.

34. The system of claim 32, further comprising means for adjusting an orientation of information with respect to said second image for said comparing with said putative bleedthrough pixel mapping.

35. The system of claim 32, further comprising means for processing said putative bleedthrough pixel mapping to remove false positive bleedthrough pixels from said mapping where there is no corresponding pixel in said second image.

36. The system of claim 35, wherein said means for processing said putative bleedthrough pixel mapping comprises means for deleting regions of putative bleedthrough pixels in said mapping smaller than a threshold value from said putative bleedthrough pixel mapping.

37. The system of claim 35, wherein said means for processing said putative bleedthrough pixel mapping comprises means for thinning regions of putative bleedthrough pixels in said mapping to thereby remove a portion of said regions.

\* \* \* \* \*

UNITED STATES PATENT AND TRADEMARK OFFICE
CERTIFICATE OF CORRECTION

| | | |
|---|---|---|
| PATENT NO. | : 7,209,599 B2 | Page 1 of 1 |
| APPLICATION NO. | : 10/194349 | |
| DATED | : April 24, 2007 | |
| INVENTOR(S) | : Steven John Simske et al. | |

It is certified that error appears in the above-identified patent and that said Letters Patent is hereby corrected as shown below:

On the title page, item (75), in "Inventors", in column 1, line 2, delete "John Roland Burns" and insert -- Roland John Burns --, therefor.

In column 19, line 6, in Claim 24, delete "cod" and insert -- code --, therefor.

In column 19, line 28, in Claim 28, delete "claim 15" and insert -- claim 25 --, therefor.

Signed and Sealed this

Nineteenth Day of May, 2009

JOHN DOLL
*Acting Director of the United States Patent and Trademark Office*